United States Patent [19]

Horn et al.

[11] 4,412,979
[45] * Nov. 1, 1983

[54] PROCESS FOR PREPARING ALUMINUM OR MAGNESIUM PHOSPHIDE

[75] Inventors: Franziskus Horn, Rodgem; Ekkehard Fluck, Frankfurt am Main, both of Fed. Rep. of Germany

[73] Assignee: Degesch, Frankfurt, Fed. Rep. of Germany

[ * ] Notice: The portion of the term of this patent subsequent to May 25, 1999, has been disclaimed.

[21] Appl. No.: 365,322

[22] Filed: Apr. 5, 1982

Related U.S. Application Data

[63] Continuation-in-part of Ser. No. 193,481, Oct. 3, 1980, Pat. No. 4,331,642.

[30] Foreign Application Priority Data

May 2, 1981 [DE] Fed. Rep. of Germany ....... 2945647

[51] Int. Cl.$^3$ ............................................. C01B 25/08
[52] U.S. Cl. .................................................... 423/299
[58] Field of Search ........................ 423/299, 111, 155

[56] References Cited

U.S. PATENT DOCUMENTS

| | | | |
|---|---|---|---|
| 3,532,464 | 10/1970 | Friemel | 423/299 |
| 3,899,572 | 8/1975 | Watanabe et al. | 423/299 |
| 4,331,642 | 5/1982 | Horn et al. | |

OTHER PUBLICATIONS

Wayne E. White and A. H. Bushey, J.A.C.S. "Aluminum Phosphide–Preparation and Composition," Oct. 1944, vol. 66, pp. 1666-1672.

*Primary Examiner*—Herbert T. Carter
*Assistant Examiner*—Steven Capella
*Attorney, Agent, or Firm*—Cushman, Darby & Cushman

[57] ABSTRACT

The invention is directed to a process of preparing the phosphide of aluminum or magnesium comprising reacting the finely divided metal or an alloy of the two metals with yellow phosphorus at a temperature between 300° and 600° C. in an inert gas atmosphere and in the presence of a catalytically effective amount of the element chlorine, bromine, or iodine or a compound of such element with phosphorus, sulfur, hydrogen, ammonium, zinc, or the metal being reacted, both the yellow phosphorus in liquid form and the finely divided metal being fed into the reaction vessel slowly.

6 Claims, No Drawings

PROCESS FOR PREPARING ALUMINUM OR MAGNESIUM PHOSPHIDE

CROSS REFERENCE TO RELATED APPLICATION

This application is a continuation-in-part of Horn et al application 193,481, filed Oct. 3, 1980 now U.S. Pat. No. 4,331,642. The entire disclosure of the Horn et al application is hereby incorporated by reference and relied upon.

BACKGROUND OF THE INVENTION

The object of the basic application (Horn et al application No. 193,481 U.S. Pat. No. 4,331,642 is the development of a process for the production of the phosphide of aluminum or magnesium in which the finely divided metal or an alloy of the two metals is reacted with yellow phosphorus at a temperature between 300° and 600° C. in an inert gas atmosphere and in the presence of chlorine, bromine, iodine, or a compound of such elements with phosphorus, sulfur, hydrogen, ammonium, zinc, or the metal being reacted.

According to a particularly preferred form, first the finely divided or gritty metal is intimately mixed with the catalyst. The mixture is heated in a suitable reactor capable of being enclosed in an inert gas atmosphere, for example, under nitrogen at normal pressure to the reaction between 300° and 600° C. When the desired reaction temperature is reached liquid yellow phosphorus is added at such a speed that the heat of reaction liberated is led off without problem and the temperature can be maintained in the range between 300° and 600° C.

SUMMARY OF THE INVENTION

It has now been found that the process of the Horn et al application can be designed still more safely and be more readily controlled and above all be designed partially or even fully continuously if the finely divided metal is also slowly added into the reaction vessel.

Therefore the process of the invention is characterized by both slowly adding the yellow phosphorus in liquid form and by slowly adding the finely divided metal into the reaction vessel.

If the process of the invention is carried out in a substantially cylindrical reaction vessel, which is heated from below the bottom then there are clearly formed four different zones which from the top to the bottom can be described as follows:

Zone 1: In this uppermost zone there exists only gas, namely a mixture of the inert gas employed and phosphorus vapor. Since in this zone in the most extreme case there is only reached a maximum temperature of about 200° C., the vapor pressure of the phosphorus is relatively small so that the gas mixture consists chiefly of the inert gas employed.

Zone 2: Here is the vaporization zone of the yellow phosphorus. In this zone there prevail temperatures which are slightly above the boiling point of the yellow phosphorus. Also in this zone there exists only gas, which now indeed consists for the greatest part of phosphorus vapor.

Zone 3: Here is located in the uppermost layer of the container filling the true reaction zone, in which phosphorus vapor comes in contact with the finely divided metal and the already formed phosphide. In this zone which is at the reaction temperature of 300° to 600° C. there takes place the strongly exothermic reaction between the phosphorus vapor and the finely divided metal. Since the phosphorus vapor reacts very quickly with the metal, it does not penetrate very deeply into the container filling but only about 10 to 15 cm. Therefore within the container filling the gas phase in the direction from the top downwardly very rapidly has a lowered phosphorus vapor content.

Zone 4: In this lowermost zone the gas phase consists practically only of inert gas because the phosphorus vapor does not penetrate to this depth. The solid material consists practically only of the phosphide formed and contains perhaps small amounts of unreacted metal. A slight excess of metal makes certain that the phosphide formed is free of phosphorus.

The formation of the previously described four zones within the reaction vessel then makes possible a particularly simple and completely safe form of the process of the invention. Thereby the liquid yellow phosphorus is continuously added into the upper part of the reaction vessel, thus in the gas space above the container packing, where it can be vaporized without hindrance. It is especially advantageous if the entrance for the liquid phosphorus is located entirely above in the reaction vessel, thus in above-mentioned zone 1. The finely divided metal to be sure can also be added in the upper part of the reaction vessel. Then, however, the quick and vigorous reaction with the phosphorus vapor already present makes necessary the use of special closing off devices for the entrance in order to prevent the phosphorus vapor from penetrating into the conveying device for the finely divided metal. Therefore it is more advantageous to continuously add the finely divided metal into the lower part of the reaction vessel, namely so that the entrance is in the region of the container filling. This can occur in the above-mentioned zone 3, the true reaction zone. Then it is suitable to provide about the height of the entrance for the metal a stirrer whose conveying elements move the container packing along the periphery of the container and thus provide for a uniform distribution of the freshly added metal in the reaction zone. However, it is still more advantageous if the addition of the finely divided metal takes place in the lowest part of the reaction vessel, thus in the above-mentioned zone 4. In this case it is suitable to provide a stirrer whose conveying elements move the container packing along the periphery of the container and simultaneously provide for a thorough mixing vertically.

It is possible in the manner depicted to continuously add equivalent amounts of finely divided metal, which contains the catalyst mixed therein, and liquid yellow phosphorus into the reaction vessel and during the reaction to withdraw from the lowest part of the reaction vessel, thus from the above-mentioned zone 4, the phosphide formed, which is free from unreacted phosphorus. The withdrawal takes place through an opening at the bottom of the reaction vessel. It can be carried out at will continuously or batchwise. In continuous withdrawal the product is discharged in an amount corresponding exactly to the metal and phosphorus added. However, it is possible just as well also to let it slowly build up in the lowermost zone in the reaction vessel, thus the above-mentioned zone 4, and then to discharge the phosphide formed batchwise. However, thereby attention must be paid that actually there is only discharged from this zone 4 material which no longer contains unreacted phosphorus, and not perhaps also material from the reaction zone, which can happen through weight control.

If the finely divided metal—as described above—is fed into the lower part of the reaction vessel, thus in the above-mentioned zone 3 or zone 4, then there suffices as feeding device a customary screw conveyer, because the solid, gritty container filling serves at the same time as closing off device. Should the process of the invention be started in an empty reaction vessel, it is therefore suitable first to introduce only finely divided metal until the entrance for the metal is covered, and only then to begin the slow addition of the liquid phosphorus. However it is still more advantageous if the reaction vessel first is filled with the corresponding phosphide from an earlier production until it is above the entrance for the metal, and then simultaneously there is begun the addition of the liquid phosphorus and the finely divided metal.

The process can comprise, consist essentially of or consist of the stated steps using the recited materials.

The process of the invention is explained in more detail in the following examples. Unless otherwise stated all percents are weight percents.

DETAILED DESCRIPTION

EXAMPLE 1

As reaction vessel there served a cylindrical container having a diameter of about 80 cm and a height of about 100 cm which was provided with a stirrer, a cooling system, temperature probes at various heights, an inlet line for inert gas and a line for waste gas. The bottom of the container was heatable by a gas burner from the outside to temperatures up to 500° C. Connected thereto was a supply vessel for liquid phosphorus having a pump which permitted at will the rotation of the liquid yellow phosphorus in the supply vessel or to feed it into the reaction vessel, as well as a supply vessel for the finely divided metal to be reacted with a conveying device for the adding of the metal into the reaction vessel. At the bottom of the reaction vessel there was located a small opening provided with a locking off device for discharge of product. For reasons of safety the reaction vessel was provided with a rupture disc to counter any possible increase in pressure. The reaction vessel was rinsed before and after the reaction with nitrogen, during the reaction the reaction mixture was covered with argon. The waste gas was led off over a water receiver having a glass fiber filter and a post-connected activated carbon filter.

Before the beginning of the reaction there were located in the reaction vessel 50 kg of magnesium phosphide from an earlier production, in the supply vessel for the metal a mixture of 200 kg of magnesium and 0.8 kg of iodine, in the supply vessel for the liquid phosphorus this was rotated. Then the reaction vessel was heated at the bottom to 300° C. Then there were fed into the reaction vessel 10 kg of magnesium and the feeding in of the liquid phosphorus was begun with a speed of 0.4 to 1 kg per minute. Simultaneously more magnesium was also added. Through the heat of reaction the temperature increased in the lower part of thte reaction vessel to 550° C. Then the addition of the phosphorus and the magnesium was so regulated that the temperature was maintained at 550° C. and the weight ratio between phosphorus and magnesium was around 0.85:1. After about 180 kg of magnesium phosphide had formed in the reaction vessel there were discharged through the withdrawal opening 100 kg of product within 10 minutes while continuously adding further phosphorus and magnesium. The withdrawal opening was again closed. After there had again formed about 180 kg of magnesium phosphide, this was again discharged and subsequently the entire process was again repeated. After using up the supply of 200 kg of magnesium the addition of phosphorus was stopped. The product still located in the reaction vessel was again heated briefly and discharged. Including the magnesium phosphide present in the reaction vessel in the course of 5 hours there were discharged 415 kg of product having a magnesium phosphide content of 92%.

EXAMPLE 2

There were present in the reaction vessel described in Example 1 a mixture of 100 kg of magnesium and 0.3 kg of iodine, in the supply vessel for the metal there was present a mixture of a further 150 kg of magnesium and 0.5 kg of iodine. Then the reaction vessel was heated at the bottom of 300° C. Then phosphorus was added at such a speed that the temperature in the lower part of the reaction vessel slowly increased to 550° C. Through control of the addition of phosphorus this temperature was maintained until altogether 82 kg of phosphorus was used. Then there were simultaneously added magnesium and phosphorus in the weight ratio 1:0.83 at such a velocity that the temperature in the lower part of the reaction vessel continuously remained between 500° and 550° C. At the same time there was continuously discharged through the withdrawal opening product in such amount that it exactly corresponded to the amount of magnesium and phosphorus added, thus altogether 150 kg of magnesium and 123 kg of phosphorus. Finally the product still found in the reaction vessel was heated again briefly and further discharged continuously. The yield in all amounted to 450 kg with an average content of magnesium phosphide of 90%.

EXAMPLE 3

There were present in the reaction vessel described in Example 1 a mixture of 50 kg of a gritty aluminum-magnesium alloy having a magnesium content of 5% and 0.2 kg of iodine. There was present in the supply vessel for the metal a mixture of a further 200 kg of the alloy mentioned and 0.6 kg of iodine. Then the reaction vessel was heated at the bottom to 450° C. Then there was begun the addition of phosphorus and alloy. Thereby the phosphorus was first added with relatively greater speed in order to compensate for the excess of alloy present, until in all there was reached a weight ratio of phosphorus to alloy of 1.1:1. The heating remained on until a temperature of 500° C. was reached in the lower part of the reaction vessel. Subsequently there were added more phosphorus and alloy in the weight ratio of 1.1:1 until the reaction vessel contained about 200 kg of product. From this point on there was continuously discharged through the withdrawal opening product at the same velocity that phosphorus and alloy were added. The addition was so adjusted that the temperature did not exceed 550° C. After use of the entire alloy the addition of the phosphorus was stopped, the heating set in operation and the remainder of the product continuously further discharged. In all there were obtained 520 kg of gritty product with a phosphide content of 90% of theory.

EXAMPLE 4

There were present in the reaction vessel described in Example 1 130 kg of aluminum phosphide from an earlier production, in the supply vessel for the metal there was a mixture of 250 kg of aluminum and 1 kg of iodine. Then the reaction vessel was heated at the bottom to 480° C. and there were introduced 20 kg of aluminum. Then there were simultaneously added aluminum and phosphorus and after reacting a temperature of 500° C. the heating stopped. The excess of metal present was compensated for by an at first somewhat quicker addition of phosphorus, then there took place the addition of aluminum and phosphorus with a constant weight ratio of 1:1.1 at such velocity that the temperature of 570° C. was not exceeded. After there were found in the reaction vessel in all 230 kg of product there was discharged 130 kg of product with constant addition of aluminum and phosphorus. This process was repeated until the 250 kg of aluminum were used up. In all there were discharged 501 kg of product with an aluminum phosphide content of 95%, around a further 155 kg was left in the reaction vessel as a heel for the next product.

As stated in the parent case there can be used as catalysts for example, chlorine, bromine, iodine, HCl, $NH_4Cl$, $SCl_2$, $SOCl_2$, $SO_2Cl_2$, $PCl_3$, $PBr_3$, $PI_3$, $PCl_5$, $P_2I_4$, $POCl_3$, $ZnCl_2$, $ZnBr_2$, $AlCl_3$, $AlBr_3$, $MgCl_2$, $MgBr_2$, $MgI_2$, HBr, HI, $NH_2$, Br, $NH_4I$, $Sbr_2$, $SO_2Br_2$, $POBr_3$, $AlI_3$, and $PBr_5$. Suitably the catalysts are used in an amount such that the weight ratio between the metal and catalyst is in the range of 10,000:1 to 10,000:200.

What is claimed is:

1. A process of preparing the phosphide of aluminum or magnesium comprising slowly adding both the finely divided metal or an alloy of the two metals and liquid yellow phosphorus to the reaction vessel at a temperature between 300° and 600° C. in an inert gas atmosphere and in the presence of a catalytically effective amount of the element chlorine, bromine, or iodine or a compound of such element with phosphorus, sulfur, hydrogen, ammonium, zinc, or the metal being reacted.

2. A process according to claim 1 wherein the reaction vessel contains solid reaction mixture or reaction product and the liquid yellow phosphorus is fed into the upper part of the reaction vessel above the solids.

3. A process according to claim 2 wherein the finely divided metal is fed into the lower part of the reaction vessel in the portion where the reaction vessel contains reaction mixture or reaction product.

4. A process according to claim 1 wherein the finely divided metal is fed into the lower part of the reaction vessel in the portion where it contains reaction mixture or reaction product.

5. A process according to claim 3 wherein the liquid yellow phosphorus is fed into a zone of the reaction vessel wherein the gaseous atmosphere consists chiefly of inert gas and has a maximum temperature of about 200° C.

6. A process according to claim 5 wherein the metal is fed into a zone of the reaction vessel below that at which the reaction occurs and the gas consists practically only of inert gas.

* * * * *